United States Patent
Rahman et al.

(10) Patent No.: US 10,180,057 B2
(45) Date of Patent: Jan. 15, 2019

(54) MEASURING INTER-RESERVOIR CROSS FLOW RATE THROUGH UNINTENDED LEAKS IN ZONAL ISOLATION CEMENT SHEATHS IN OFFSET WELLS

(71) Applicant: Saudi Arabian Oil Company, Dhahran (SA)

(72) Inventors: Noor M. Anisur Rahman, Dhahran (SA); Hasan A. Nooruddin, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 346 days.

(21) Appl. No.: 14/601,769

(22) Filed: Jan. 21, 2015

(65) Prior Publication Data
US 2016/0208599 A1  Jul. 21, 2016

(51) Int. Cl.
*E21B 47/00* (2012.01)
*G01V 99/00* (2009.01)
*E21B 47/06* (2012.01)
*E21B 49/00* (2006.01)

(52) U.S. Cl.
CPC .......... *E21B 47/06* (2013.01); *E21B 47/0005* (2013.01); *E21B 49/008* (2013.01); *G01V 99/00* (2013.01)

(58) Field of Classification Search
CPC .......... E21B 47/00; E21B 43/14; E21B 43/26; E21B 47/10; E21B 49/003; E21B 49/087; E21B 47/005; E21B 47/06; E21B 49/008; G01V 99/00; B01D 2271/027; B01D 46/0046

USPC ......... 73/152.51; 166/250.01, 250.08, 253.1; 340/605–606; 702/12–13
See application file for complete search history.

(56) References Cited

U.S. PATENT DOCUMENTS

| | | |
|---|---|---|
| 3,246,145 A | 4/1966 | Higgins |
| 3,784,828 A | 1/1974 | Hayes |
| 3,892,128 A | 7/1975 | Smith, Jr. |
| 3,905,226 A | 9/1975 | Nicolas |

(Continued)

FOREIGN PATENT DOCUMENTS

WO   2011019565 A2   2/2011

OTHER PUBLICATIONS

Kremenetskiy et al., "Well-Test Interpretation with Behind-the-Casing Crossflows", 2008, SPE 115323.*

(Continued)

*Primary Examiner* — Randy Gibson
*Assistant Examiner* — Gedeon M Kidanu
(74) *Attorney, Agent, or Firm* — Bracewell LLP; Constance G. Rhebergen; Albert B. Kimball, Jr.

(57) ABSTRACT

Crossflow between two adjacent reservoir layers through leaky cement sheaths in offset wells during transient-pressure tests in one of the two reservoir layers is diagnosed and quantified. The obtained measures are determined based on individual well and layer properties. The pressure drawdown in the reservoir layer in which pressure transient testing is being performed is measured as a function of time. The longitudinal conductivity of a leaky cement sheath in an offset well and the pressure drawdown in the tested reservoir layer simultaneously control the crossflow rate to the tested reservoir layer from the adjacent reservoir layer at a given time.

16 Claims, 7 Drawing Sheets

(56) References Cited

U.S. PATENT DOCUMENTS

| | | |
|---|---|---|
| 4,028,546 A | 6/1977 | Peelman et al. |
| 4,173,718 A | 11/1979 | Fertl |
| 4,215,567 A | 8/1980 | Vlcek |
| 4,353,122 A | 10/1982 | Cubberly, Jr. |
| 4,475,591 A | 10/1984 | Cooke, Jr. |
| 4,799,157 A | 1/1989 | Kuck et al. |
| 4,803,873 A | 2/1989 | Ehlig-Economides |
| 4,969,130 A | 11/1990 | Wason et al. |
| 5,031,467 A | 7/1991 | Rambow |
| 5,305,209 A | 4/1994 | Stein et al. |
| 5,509,474 A * | 4/1996 | Cooke, Jr. ............ E21B 47/065 166/250.01 |
| 5,548,563 A | 8/1996 | Slevinsky |
| 5,586,082 A | 12/1996 | Anderson et al. |
| 5,730,219 A | 3/1998 | Tubel et al. |
| 5,787,050 A | 7/1998 | Slevinsky |
| 5,803,167 A | 9/1998 | Bussear et al. |
| 5,829,520 A | 11/1998 | Johnson |
| 5,975,204 A | 11/1999 | Tubel et al. |
| 6,840,317 B2 | 1/2005 | Hirsch et al. |
| 6,898,986 B2 | 5/2005 | Daniel et al. |
| 6,980,940 B1 | 12/2005 | Gurpinar et al. |
| 7,089,167 B2 | 8/2006 | Poe |
| 7,240,568 B2 | 7/2007 | Atkinson |
| 7,293,471 B2 | 11/2007 | Lund Bo et al. |
| 7,369,979 B1 | 5/2008 | Spivey |
| 7,389,185 B2 * | 6/2008 | Craig ............ E21B 49/008 702/13 |
| 7,580,797 B2 | 8/2009 | Akram et al. |
| 7,708,086 B2 | 5/2010 | Witte |
| 7,774,140 B2 | 8/2010 | Craig |
| 8,065,923 B2 | 11/2011 | Duhanyan et al. |
| 8,244,509 B2 | 8/2012 | Banerjee et al. |
| 8,275,593 B2 | 9/2012 | Zhao |
| 8,437,997 B2 | 5/2013 | Meurer et al. |
| 8,473,268 B2 | 6/2013 | Benish et al. |
| 8,620,611 B2 | 12/2013 | Ong |
| 8,620,636 B2 | 12/2013 | Zhan et al. |
| 8,781,747 B2 | 7/2014 | Ziauddin |
| 8,793,110 B2 | 7/2014 | Myers et al. |
| 8,793,112 B2 | 7/2014 | Levitan |
| 9,068,872 B2 | 6/2015 | Gysling |
| 9,085,966 B2 | 7/2015 | Rahman |
| 9,261,869 B2 | 2/2016 | Cheng et al. |
| 9,367,653 B2 | 6/2016 | Madasu et al. |
| 9,417,970 B2 | 8/2016 | Fulton et al. |
| 9,513,241 B2 | 12/2016 | Whittaker |
| 9,569,521 B2 | 2/2017 | Crafton |
| 9,617,833 B2 | 4/2017 | Madasu et al. |
| 9,626,466 B2 | 4/2017 | Yang et al. |
| 2002/0043370 A1 | 4/2002 | Poe |
| 2002/0189337 A1 | 12/2002 | Maute |
| 2009/0126475 A1 * | 5/2009 | Zhang ............ E21B 49/00 73/152.05 |
| 2009/0308601 A1 | 12/2009 | Poe, Jr. et al. |
| 2010/0082258 A1 | 4/2010 | Wang |
| 2010/0224361 A1 | 9/2010 | Pope et al. |
| 2011/0015909 A1 | 1/2011 | Zhao |
| 2011/0040536 A1 * | 2/2011 | Levitan ............ E21B 49/00 703/2 |
| 2011/0191029 A1 | 8/2011 | Jalali et al. |
| 2012/0018167 A1 | 1/2012 | Konopczynski et al. |
| 2012/0092690 A1 | 4/2012 | Gaston et al. |
| 2013/0080128 A1 | 3/2013 | Yang |
| 2013/0186688 A1 | 7/2013 | Rasmus et al. |
| 2013/0205886 A1 | 8/2013 | Hegeman et al. |
| 2013/0231867 A1 | 9/2013 | Lin et al. |
| 2013/0245952 A1 | 9/2013 | Lin et al. |
| 2013/0255940 A1 | 10/2013 | Rochford et al. |
| 2014/0083687 A1 | 3/2014 | Poe et al. |
| 2014/0257775 A1 | 9/2014 | Levitan |
| 2015/0233233 A1 | 8/2015 | Rahman |
| 2015/0276970 A1 | 10/2015 | Wu et al. |
| 2016/0061020 A1 | 3/2016 | Sayarpour |
| 2016/0177679 A1 | 6/2016 | Zhang et al. |
| 2016/0178799 A1 | 6/2016 | Sayarpour et al. |

OTHER PUBLICATIONS

Al-Khalifa et al., "Multiphase Well Test Analysis: Pressure and Pressure-Squared Methods", SPE California Regional Meeting held in Bakersfield, California, 1989, pp. 581-590, SPE 18803.

Anbarchi et al., "Determination of Front Locations in a Multilayer Composite Reservoir", The 64th Annual Technical Conference and Exhibition of the Society of Petroleum Engineers held in Texas, 1989, pp. 285-296, SPE19799.

Bourdet, D. "Chapter 1: Principles of Transient Testing" Well Test Analysis: The Use of Advanced Interpretation Models, 2002, pp. 1-23.

Bourdet, D. "Chapter 2: The Analysis Methods" Well Test Analysis: The Use of Advanced Interpretation Models, 2002, pp. 25-46.

Cheng-Tai, "Single-Phase Fluid Flow in a Stratified Porous Medium With Crossflow", Society of Petroleum of Engineers Journal, 1984, pp. 97-106, SPE of AIME.

Ehlig-Economides et al., "A New Test for Determination of Individual Layer Properties in a Multilayered Reservoir", SPE Formation Evaluation, 1987, pp. 261-283, SPE14167.

Gringarten, A. "From Straight Lines to Deconvolution: The Evolution of the State of the Art in Well Test Analysis" SPE 102079, 2006 SPE Annual Technical Conference & Exhibition, San Antonio, Texas, Sep. 24-27, 2006, pp. 41-62.

Perrine, "Analysis of Pressure-buildup Curves", Presented at the spring meeting of the Pacific Coast District, Division of Production, 1956, pp. 482-509.

Rahman et al., "Profiling Pressure-Derivative Values—A New, Innovative Way to Estimate the Radii of Investigation in Heterogeneous Reservoir Systems", SPE Middle East Oil & Gas Show & Exhibition, Manama, Bahrain, Mar. 10-13, 2013, pp. 1-12, SPE164217.

Stehfest, "Algorithms" Communications of the ACM, vol. 13, No. 1, Jan. 1970, pp. 47-54.

Stehfest, "Algorithms 368", Communications of the ACM, Jan. 1970, pp. 47-49. vol. 13, No. 1.

Related U.S. Appl. No. 14/182,430, tiled Measuring Behind Casing Hydraulic Conductivity Between Reservoir Layers filed Feb. 18, 2014.

Related U.S. Appl. No. 14/595,299, tiled Measuring Inter-Reservoir Cross Flow Rate Between Adjacent Reservoir Layers From Transient Pressure Tests filed Jan. 13, 2015.

Related U.S. Appl. No. 14/613,780, tiled Estimating Measures of Formation Flow Capacity and Phase Mobility From Pressure Transient Data Under Segregated Oil and Water Flow Conditions filed Feb. 4, 2015.

Al-Mutairi et al., "Fully Integrated Approach Using Temperature Measurements to Describe Complex Reservoirs: Case Study from Saudi Arabia", SPE Annual Technical Conference and Exhibition held in New Orleans Louisiana, 2013, pp. 1-13, SPE 166159.

International Search Report and Written Opinion for related PCT application PCT/US2016/014260 dated Jun. 13, 2016.

Kremenetskiy et al., "Well-Test Interpretation with Behind-the-Casing Crossflows", SPE Russian Oil & Gas Technical Conference and Exhibition held in Moscow Russia, 2008, pp. 1-12, Society of Petroleum Engineers.

Bakulin et al., "Acoustic signatures of crossflow behind casing in commingled reservoirs: A case study from Teapot Dome", Geophysics, 2008, pp. 145-152, vol. 73, No. 4, Society of Exploration Geophysicists.

Chu et al., "Pressure Transient Analysis of Two-Phase Flow Problems", SPE Formation Evaluation, 1986, pp. 151-164, Society of Petroleum Engineers.

International Search Report and Written Opinion for related PCT application PCT/US2015/015610 dated Jun. 29, 2015.

International Search Report and Written Opinion for related PCT application PCT/US2016/013147 dated Jul. 4, 2016.

International Search Report and Written Opinion for related PCT application PCTUS2016/016330 dated Jun. 7, 2016.

(56) References Cited

OTHER PUBLICATIONS

Partial Search Report for related PCT application PCT/US2016/013147 dated Apr. 26, 2016.
Ehlig-Economides et al., "Vertical Interference Testing Across a Low-Permeability Zone", SPE Formation Evaluation, 1986, p. 1-18, Society of Petroleum Engineers.
Gao Chengtai, "The Crossflow Behavior and the determination of Reservoir Parameters by Drawdown Tests in Multilayer Reservoirs", Society of Petroleum Engineers, 1983, pp. 1-31, SPE 12580.
Kamal et al., "Pressure Transient Testing Under Multiphase Flow Conditions", SPE Middle East Oil and Gas Show and Conference held in Manama Bahrain, 2011, pp. 1-10, SPE 141572.
Zheng et al., "New Approaches for Analyzing Transient Pressure from Oil and Water Two-Phase Flowing Reservoir", 2009 Kuwait International Petroleum Conference and Exhibition, 2009, pp. 1-25, Society of Petroleum Engineers.

\* cited by examiner

CROSSFLOW RATE FROM ADJACENT TO TESTED LAYER $$q^*_j(x^*_j, y^*_j, t) = \frac{F_{cj}[p_0 - p(X = X^*_j, Y = Y^*_j, t)]}{282.4\pi\mu}$$

US 10,180,057 B2

MEASURING INTER-RESERVOIR CROSS FLOW RATE THROUGH UNINTENDED LEAKS IN ZONAL ISOLATION CEMENT SHEATHS IN OFFSET WELLS

BACKGROUND OF THE INVENTION

1. Field of the Invention

The present invention relates to pressure transient testing of producing hydrocarbon (oil and gas) reservoirs, and more particularly to measuring inter-reservoir cross flow rates through unintended leaks in zonal isolation cement sheaths in offset wells from a reservoir layer being tested.

2. Description of the Related Art

In oil and gas production, it is common to have multiple layers in a subsurface reservoir, containing producible amounts of oil and gas. With multiple layers it is common to employ wells, known as producing and offset wells, which are spaced from each other to produce from the different productive layers.

For evaluation, planning, and other purposes, pressure-transient tests are performed on the productive layers of the reservoir. With offset wells, there is often an adjacent reservoir layer to a tested reservoir layer, and producing wells are drilled through the adjacent reservoir layer to obtain production. The tested layer and the adjacent layer are separated by non-reservoir rocks or tight streaks with practically zero permeability, and there is no crossflow directly between such reservoir layers.

When the adjacent reservoir layer is located below the tested reservoir layer, only the offset wells are completed to produce from this adjacent reservoir. This means that offset wells are drilled deeper to reach the adjacent reservoir layer, bypassing the tested reservoir layer. Under normal conditions, the offset wells, passing through the tested reservoir layer, are isolated from the tested reservoir layer with cement sheath in the offset wells over the intervals passing through the tested reservoir. Thus, both the tested and adjacent reservoir layers are still isolated and no crossflow of fluids is expected.

However, there are situations when the cement sheaths in the offset wells over the intervals passing through the tested reservoir layer loses its integrity through what are known as unintentional leaks, and establishes some finite conductivity of fluid. This can allow the flow of fluid from the adjacent reservoir layer to the tested reservoir layer as the tested layer is subject to pressure drawdown.

With time the pressure drawdown in the tested reservoir layer increases. The differential pressure across the impermeable streak, located between the tested and the adjacent reservoir layers, can grow due to continuous production from the tested reservoir layer. The flow from offset wells through such unintended leaks interferes with accurate layer flow measurement. Such interference can cause an overestimation of the producibility of the tested layer under investigation.

Loss of integrity in offset well cement sheaths with time can contribute to substantial growth of inter-reservoir crossflow rates, which needs to be accounted for when characterizing the commercial producibility of the tested reservoir layer. In addition, remedial workover operations on the leaky offset well(s) may be warranted based on the rates of leakage.

The offset wells may in some cases be observation wells or abandoned wells in the adjacent layer rather than producing ones. The observation wells or abandoned wells, if present, are still intersecting both reservoir layers and allowing leakage of fluid from the adjacent to the tested reservoir layer when there are unintentional cement sheath leaks.

SUMMARY OF THE INVENTION

Briefly, the present invention provides a new and improved computer implemented method of determining a measure of inter-reservoir crossflow rate to a tested layer of a subsurface reservoir through leaks in cement sheaths of offset wells in the tested layer during a pressure transient test of the tested layer. A test measure is obtained of well pressure during the pressure transient test of the tested layer, and subsequently a test pressure derivative of well pressure is determined at sampled instants of measurement during the pressure transient test of the tested layer. Values of conductivity of the cement sheaths of the offset wells are estimated, and a model wellbore flowing pressure at the tested layer is determined based on the test measure of well pressure and the estimated values of conductivity of the cement sheaths of the offset wells. A model pressure derivative is determined based on the model pressure derivative and the estimated values of conductivity of the cement sheaths of the offset wells. A model inter-reservoir crossflow rate to the tested layer is determined based on the estimated values of conductivity of the cement sheaths of the offset wells. The model wellbore flowing pressure is compared with the test measure of well pressure, and the model pressure derivative is compared with the test pressure derivative. If the estimated measures and test measures match within an acceptable degree of agreement, the estimated values of conductivity of the cement sheaths of the offset wells, the model inter-reservoir crossflow rate to the tested layer, the model wellbore flowing pressure, and the model pressure derivative are stored. If not, the estimated values of conductivity of the cement sheaths of the offset wells are adjusted, and the steps repeated of determining a model wellbore flow pressure, determining a model pressure derivative, determining a model inter-reservoir crossflow rate to the tested well and comparing based on the adjusted estimated values of conductivity of the cement sheaths of the offset wells.

The present invention also provides a new and improved data processing system for determining a measure of inter-reservoir crossflow rate to a tested layer of a subsurface reservoir through leaks in cement sheaths of offset wells in the tested layer during a pressure transient test of the tested layer. The data processing system includes a processor which obtains a test measure of well pressure during the pressure transient test of the tested layer, and also determined a test pressure derivative of well pressure at sampled instants of measurement during the pressure transient test of the tested layer. The processor receives estimated values of conductivity of the cement sheaths of the offset wells, and determines a model wellbore flowing pressure of the formation layers based on the test measure of well pressure and the estimated values of conductivity of the cement sheaths of the offset wells. The processor also determines a model pressure derivative based on the model well pressure derivative and the estimated values of conductivity of the cement sheaths of the offset wells, and determines a model inter-reservoir crossflow rate to the tested layer based on the estimated values of conductivity of the cement sheaths of the offset wells. The processor compares the model wellbore flowing pressure with the test measure of well pressure, and also compares the model pressure derivative with the test pressure derivative. If the estimated measures and test measures match within an acceptable degree of agreement, the processor stores in a memory of the data processing system the estimated values of conductivity of the cement sheaths of the offset wells, the model inter-reservoir crossflow rate to the tested layer, the model wellbore flowing pressure, and the model pressure derivative. If not, the processor adjusts the estimated values of conductivity of the cement sheaths of the offset wells, and repeats the steps of determining a model wellbore flow pressure, determining a model pressure derivative, determining a model inter-reservoir crossflow rate to the tested well and comparing, based on the adjusted estimated values of conductivity of the cement sheaths of the offset wells.

The present invention further provides a new and improved data storage device which has stored in a non-transitory computer readable medium computer operable instructions for causing a data processing system to determine a measure of inter-reservoir crossflow rate to a tested layer of a subsurface reservoir during a pressure transient test of the tested layer. The instructions stored in the data storage device cause the data processing system to obtain a test measure of well pressure during the pressure transient test of the tested layer, and also determine a test pressure derivative of well pressure at sampled instants of measurement during the pressure transient test of the tested layer. The instructions also cause the data processing system to receive estimated values of conductivity of the cement sheaths of the offset wells, and to determine a model wellbore flowing pressure of the formation layers based on the test measure of well pressure and the estimated values of conductivity of the cement sheaths of the offset wells. The instructions also cause the data processing system to determine a model pressure derivative based on the test pressure derivative and the estimated values of conductivity of the cement sheaths of the offset wells, and to determine a model inter-reservoir crossflow rate to the tested layer based on the estimated values of conductivity of the cement sheaths of the offset wells. The instructions also cause the data processing system to compare the model wellbore flowing pressure with the test measure of well pressure, and compare the model pressure derivative with the test pressure derivative. If the estimated measures and test measures match within an acceptable degree of agreement, the instructions also cause the data processing system to store in a memory of the data processing system the estimated values of conductivity of the cement sheaths of the offset wells, the model inter-reservoir crossflow rate to the tested layer, the model wellbore flowing pressure, and the model pressure derivative. If not, the instructions cause the data processing system to adjust the estimated values of conductivity of the cement sheaths of the offset wells, and repeat the steps of determining a model wellbore flow pressure, determining a model pressure derivative, determining a model inter-reservoir crossflow rate to the tested well and comparing, based on the adjusted estimated values of conductivity of the cement sheaths of the offset wells.

DETAILED DESCRIPTION OF THE PREFERRED EMBODIMENTS

Pressure transient tests are performed on exploratory and development wells to assess the reservoir productivity on a commercial scale. Reservoir permeability and/or mobility, formation damage parameter in terms of skin factors, reservoir pressure, reservoir size and shape, and locations of main geological features or boundaries are the most important parameters that are usually determined through such tests. To ascertain the accuracy of the reservoir parameters, often individual reservoir layers are tested separately. These layers can be separated by impermeable, non-reservoir strata (geological barriers to fluid flow in the vertical direction) whose thicknesses can vary from a few inches to few hundred feet.

A pressure transient test is performed to characterize an individual reservoir layer while accounting for the production from this tested layer only. While performing transient tests on the tested reservoir layer, the test results become unreliable and misleading when an adjacent reservoir layer contributes to the production from the tested reservoir layer, as described above.

Figure 1:
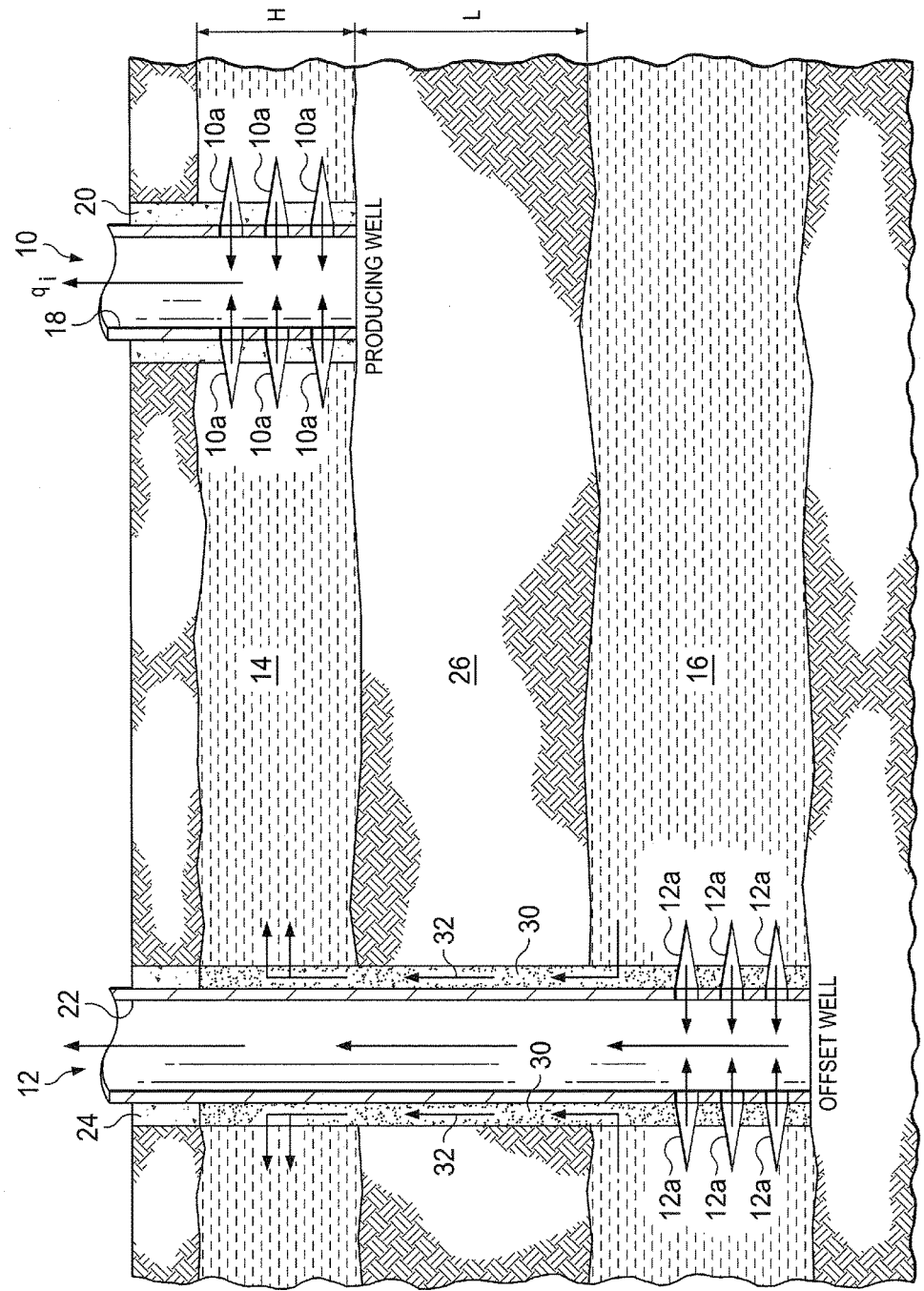
FIG. 1 is a schematic view, taken in cross-section, of a producing well in the earth illustrating the crossflow from an adjacent reservoir layer to a tested reservoir layer through compromised zonal isolation (leaky cement sheath) around an offset well.

In the drawings, FIG. 1 illustrates a layered reservoir system R having producing wells 10 and 12 which are completed in different reservoir layers 14 and 16, respectively, of the reservoir R. Well 10 is considered as the tested well, and well 12 is considered as an offset well. The layer 14 to be tested by pressure transient testing is of a thickness h and is identified for the purposes of the present invention as a test or tested reservoir layer. The layer 16 is identified as an adjacent reservoir layer.

Figure 2:
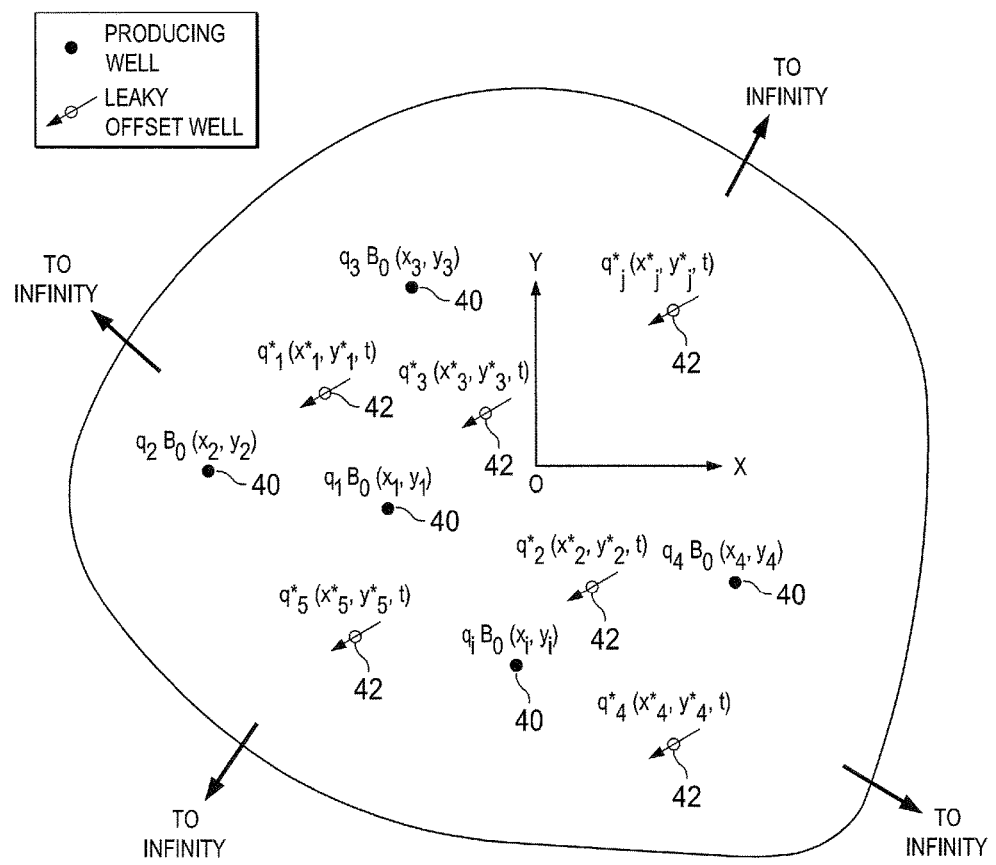
FIG. 2 is a plan or aerial view showing schematically example locations of producing and leaky offset wells in a tested reservoir layer such as FIG. 1.

Offset wells such as shown at 12 are for the purposes of the present invention illustrated as drilled deeper to reach the adjacent reservoir layer 16, bypassing the tested reservoir layer 14. There can be more than one offset well with unintended leakage as shown in FIG. 2. It should be understood, however, that having the tested reservoir layer located above the adjacent reservoir layer is not a necessary condition for the purposes of the present invention. It is only required that there be two geologically isolated reservoir layers, with some wells with compromised zonal isolation intersecting both layers, facilitating crossflow in the events of existence of any differential pressure between the layers.

The well 10 is completed in the test layer 14 of reservoir R by perforations 10$a$ in a production casing string 18 and casing cement 20. Similarly, the offset well 12 is completed in the adjacent layer 16 of reservoir R by perforations 12$a$ in a production casing string 22 and casing cement 24. Sometimes the completed intervals, such as 10$a$ and 12$a$, are open, called open hole completions. The casing cement 24 for casing string 22 of offset well 12 extends through the test layer 14 and is intended to serve as a sheath, and isolate well 12 from fluid production from layer 14 and well 10 from fluid production flow from layer 16. The reservoir layers 14 and 16 are separated by an impermeable strata 26 which has a thickness L. Hence, during production from each of reservoir layer 14 and 16 so long as the integrity of the cement sheath in offset wells such as casing cement 24 in well 12 holds, fluid from the adjacent layer 16 does not flow because of differential pressure between the adjacent layer 12 and the tested layer 14.

As the reservoir layers 14 and 16 are separated by the impermeable (zero permeability in both vertical and horizontal directions) strata 26, there is no opportunity for any fluid from the adjacent reservoir layer 16 to migrate to the tested layer 14 one during well (transient-pressure) testing operations or during any normal producing conditions. If none of the layers are subject to any production, the pressures in individual layers may stay hydrodynamically balanced, and there cannot be any crossflow of fluids between the adjacent reservoir layers.

However, there are occasions when the cement sheath 24 between the producing layers 14 and 16 over the intervals passing through the tested reservoir layer 14 in the offset well 12 loses its integrity and unintentional leaks occur, as indicated by an annular region 30 of compromised zonal isolation in the casing cement 24. The leaks through compromised zonal isolation in region 30 occur unintentionally due to one or more of several factors. These include operational age, environment, type of material or workmanship. Such leaks create some finite conductivity to flow of fluid. There thus develops an opportunity for fluid to flow, as indicated schematically by arrows 32, through region 30 from the adjacent reservoir layer 16 to the tested reservoir layer 14. Whenever zonal isolation is compromised by unintentional cement sheath leaks, crossflow of fluid from one layer to the other through reservoir complicates the assessment of the commercial producibility and the characterization of the tested reservoir layer.

If the tested reservoir layer, as in this case, is subject to production through the producing well(s), the pressure declines in the tested layer 14, causing a pressure differential across the impermeable streak 26. It is assumed that the adjacent reservoir layer is so large that its pressure is not declining appreciably, that there is a balanced condition of oil production from and water injection into this reservoir layer.

Due to a sustained condition for balanced oil production from and water injection into the adjacent reservoir layer, the reservoir pressure is often constant at the adjacent reservoir layer over a period of time.

Any pressure differential between the tested and the adjacent reservoir layers facilitates crossflow of fluids from the adjacent reservoir layer at a higher pressure to the tested layer at a lower pressure through compromised cement (if any) sheath in the offset wells. With time the pressure differential at the location of the offset well may grow, and thus so may the rate of crossflow. The present invention provides a systematic method to assess time-dependent rates of crossflow from transient-pressure tests in such conditions.

The influx into the tested reservoir layer from the adjacent reservoir layer through the leaky cement sheath such as at 30 in the offset wells such as 12 due to the pressure drawdown in the tested layer 14 is measured according to the present invention. The present invention does not consider other kinds of crossflow (e.g., through the wellbore or through the reservoir) but only crossflow behind the casing in the offset wells.

Of the physical features that characterize the rate of crossflow from one or more adjacent layers such as 16 to the tested layer 14, the conductivity of a leaky cement sheath, such as present in the associated offset wells, and the pressure differentials between the tested layer and the adjacent layers are the principal constituents of estimating the crossflow rates.

For simplicity of illustration, FIG. 1 depicts a single producing well 10 and a single offset well 12. It should be understood, however, that the methodology of the present invention provides for measuring inter-reservoir cross flow rate through unintended leaks in zonal isolation cement sheath in offset wells for multiple wells in a reservoir. Thus, the present invention is applicable for a number m of producing wells and n of leaky offset wells in the tested reservoir layer R, as will be described.

During pressure transient tests of the test layer 14, crossflow from the adjacent reservoir layer 16 to the tested reservoir layer 14 often occurs through the compromised zonal isolation (leaky cement sheath) around the offset well 12. Some of the fluid produced from the tested reservoir layer through the producing well 10 may have migrated from the adjacent reservoir layer. It is also contemplated with the present invention that the offset wells, may be simultaneously contributing fluid from the adjacent reservoir layer to the tested reservoir layer through its compromised completion.

Referring to FIG. 2, according to the present invention, inter-reservoir crossflow rates are determined due to multiple producing wells 40 of the type shown at 10 in FIG. 1 and multiple offset wells 42 of the type shown at 12 in FIG. 1. There can be m number of vertical producing wells 40 at arbitrary locations $[(x_i, y_i), i=1, 2, 3, \ldots, m]$ in the tested reservoir layer, and n number of vertical, leaky offset wells at arbitrary locations $[(x_j^*, y_j^*), j=1, 2, 3, \ldots, n]$ affecting the reservoir dynamics in the tested reservoir layer 14. The index i refers to the ith of m producing wells, the index j refers to the jth of n leaky offset wells. These indices are consistently used herein as subscripts.

The hydraulic conductivity $F_{cj}$ of the compromised zonal isolation (cement sheath) in the jth of n leaky offset wells is characterized as:

$$F_{cj} = \frac{k_{0j} A_{0j}}{L_j}. \tag{1}$$

The unit of $F_{cj}$ is md.ft, $k_{0j}$ is the average longitudinal permeability of the cement in md, $A_{0j}$ is the average annular area of the cement in sq. ft., and $L_j$ is the distance between the layers or the height of the leaky cement column in ft. The rate of crossflow from the adjacent layer depends on the conductivity of the cement sheath behind casing and the existing pressure differential at the locations where the offset well intersects the two layers. Thus, any leakages in the cement sheaths mean non-zero, positive values of the hydraulic conductivity of the cement sheaths.

If the conductivity is too low (probably due to $k_{0j} \to 0$), as in the case of total integrity of the cement sheath in the offset well, the adjacent layer may not be able to interfere with the tested reservoir layer at all due to the zero or a negligible rate of fluid influx at any given time. However, if the conductivity is too high (probably due to $k_{0j} \to \infty$), as in the case of total collapse of the cement sheath in the offset well considerable fluid influx occurs. This situation corresponds to having a small section of the size of the offset well in the tested reservoir layer (equivalent to a mathematical point in the domain of the tested reservoir layer) at the same pressure as the reservoir pressure of the adjacent reservoir layer.

In general, with several leaky offset wells it is difficult to know the individual components on the right-hand side of Equation (1) to estimate the value of $F_{cj}$ (j=1, 2, 3, ..., n). Thus, one of the purposes of transient-pressure tests is to evaluate effective values of $F_{cj}$ in a layered-reservoir system. Based on the values of cement sheath conductivity, the present invention provides the ability to measure or estimate the rates of crossflow through each leaky offset well (j=1, 2, 3, ..., n).

Figure 3:
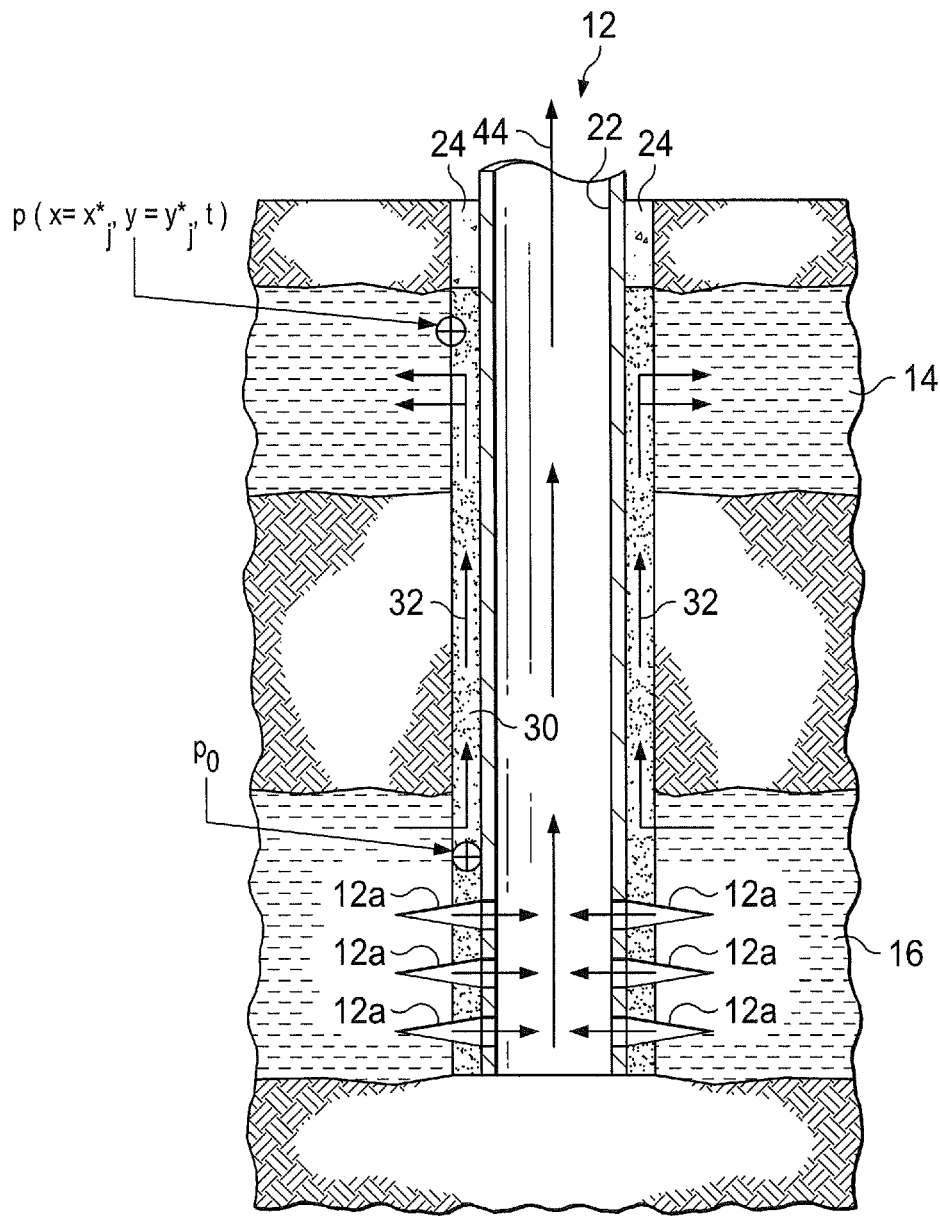
FIG. 3 is a schematic diagram illustrating the rate of fluid influx from an adjacent to a tested reservoir layer and related parameters for inter-reservoir crossflow between the adjacent reservoir layers of FIG. 1.

Turning to FIG. 3, a schematic illustration is provided of a situation where some of the fluid produced from the tested reservoir layer 14 through the producing well 40 (FIG. 2) may have migrated from the adjacent reservoir layer 16 (FIGS. 1 and 3). It is to be noted that the offset well 12 (FIG. 3) representing a leaky offset well 42 (FIG. 2) may be simultaneously producing directly from layer 16. This is indicated at 44 (FIG. 3) to illustrate flow from the adjacent reservoir layer 16 through its production string 22.

The rate of crossflow $q_j^*$ at the reservoir condition at a given time t from the adjacent reservoir layer 16 of FIG. 3 to the tested reservoir layer 14 through the leaky cement sheath 30 in the jth of n leaky offset wells 42, located as shown in FIG. 2 at $(x_j^*, y_j^*)$, is given by:

$$q_j^*(x_j^*, y_j^*, t) = \frac{F_{cj} \Delta p(x_j^*, y_j^*, t)}{282.4 \pi \mu} \quad (2)$$

As per Equation (2), the influx rate, $q_j^*(x_j^*,y_j^*, t)$ with (j=1, 2, 3, ..., n) in bbl/d (at reservoir conditions) from the adjacent reservoir layer 16, depends on the hydraulic conductivity, $F_{cj}$, as defined in Equation (1), on the pressure differential, $\Delta p(x_j^*,y_j^*, t)$, between the tested and the adjacent reservoir layers 14 and 16, respectively, and also on the viscosity μ, of the fluid. It is to be noted that the fluid properties (viscosity and formation volume factor) of both layers are considered identical for simplicity. Similar expressions for the rate of influx can be presented for the other leaky offset wells in the tested reservoir layer.

The reservoir pressure in the adjacent layer 16 has been considered to remain in the initial reservoir pressure, $p_0$, during the test duration. This is a reasonable assumption from the experiences of applicants. The adjacent layer 16 is often very large and in effect for analytical purposes without limit as indicated schematically ("To Infinity") in FIG. 2. This is as a result of layer 16 being subject to an intensive, but balanced, water-injection program for maintaining the reservoir pressure during oil production. Thus, Equation (2) is the basis of computing determining the crossflow rates from the adjacent to the tested reservoir layer at a given time for the corresponding version in the Laplace domain, as described below in Equation (5).

Thus, with the present invention, an analytical solution to the pressure-transient behavior of a two-layer system subject to crossflow through the leaky cement sheath in offset well(s) in the reservoir provides a methodology of determining or measuring the crossflow rates through the leaky offset well(s). This analytical solution also provides type curves which help diagnose the existence of any such crossflow in the reservoir.

In addition, this solution helps build models out of actual data from pressure transient tests. The solution also provides the ability to estimate the rate of crossflow through the leaky cement sheath in an offset well from the adjacent reservoir layer to the tested reservoir layer at a given time. When in the description below reference is made to a model, this is a reference to the analytical solution, which provides a tangible understanding of the pressure behavior of the layered-reservoir system being dealt with.

Presentation of the Model

The equations expressing the physical relationships of layer crossflow from an analytical solution are expressed below. It is to be noted that all the equations presented here are in the system of US Oilfield units, and conversion to any another system of units may be readily performed and is contemplated within the present invention.

The effects of wellbore storage and skin factor in the producing well completed in the active layer are included. The pressures considered here are corrected to a datum depth. The production rates at the producing wells are regarded as being at the standard conditions, and the rates of influx through the offset wells at the reservoir conditions.

As disclosed above, the present invention is applicable for reservoirs with numbers of the two types of wells (producing and offset) in a reservoir. This permits consideration of the interference or effects of each of multiple nearby wells on the pressure-transient behavior while upholding the generality of the problem. Reservoir engineer and analyst users are able to select one of the producing wells, where pressures and rates are measured meticulously, as the tested well in a given system as presented in FIG. 2. Further discussion on the tested well is set forth below following the Nomenclature definitions.

The producing wells may have the presence of wellbore storage constants and skin factors. In the ith producing well (i=1, 2, 3, ..., m), the wellbore storage constant, $C_i$, in bbl/psi, takes care of the phenomenon when it exists, while the skin factor, $s_i$, is considered through the effective wellbore radius, $r_{wai}$, related to the actual wellbore radius of $r_{wi}$, as:

$$r_{wai} = r_{wi} e^{-s_i} \quad (3)$$

Set forth below are the major working equations of the analytical solution, also interchangeably referred to as the model, which are used in determining or calculating pressures and crossflow rates between the reservoir layers. In the model, each producing well is producing at a distinct, constant rate of $q_i$ STB/d, (i=1, 2, 3, ..., m), commencing from elapsed time t=0 onward, while the pressure drawdown and the pressure derivative at the tested well, and the crossflow rates at each leaky offset well with elapsed time are estimated. The Laplace transforms have been performed on the quantities which are time-dependent to make the original partial differential equations solvable.

It is to be noted that the equations for the pressure drawdown $(\Delta p_w(t))$ in psia at the tested well, and the crossflow rates $(q_j^*(x_j^*, y_j^*, t))$ in bbl/d in each leaky offset well (j=1, 2, 3, ..., n), are presented in the Laplace domain as $\overline{\Delta p_w}(l)$ and $\overline{q}_j^*(x_j^*, y_j^*, l)$, respectively. These equations are valid while all the producing wells are flowing with l as the Laplace-space parameter due to the time variable t in hr. The values of these variables in the Laplace domain thus need to be inverted back to the time domain with the Stehfest algorithm, as described in: Stehfest, H., 1970, Algorithm 368: Numerical Inversion of Laplace Transforms. Communications of ACM 13(1): 47-49.

It is preferable to select as a tested well from among the producing wells in the system, one for which the production rates and pressures are accurately and rigorously according to an established regimen. It may also occur that there can be more than one well which would qualify to be a "tested well". For brevity in the explanation below, the selected well or tested well is designated as the m'th producing well (thus, (1≤m'≤m)), located at $(x_{m'}, y_{m'})$.

NOMENCLATURE $B_o$ Formation volume factor of fluid, bbl/STB
$c_t$ Total system compressibility in tested layer, 1/psi
$C_i$ Wellbore storage constant in the ith producing well, bbl/psi
$F_{cD}$ Dimensionless conductivity of cement sheath, dimensionless, defined in Equation (13)
$F_{cj}$ Conductivity of cement sheath in jth leaky offset well, md.ft, defined in Equation (1)
h Pay thickness of tested reservoir layer, ft
i Index for ith producing well, i=1, 2, 3, . . . , m
j Index for jth leaky offset well, j=1, 2, 3, . . . , n
k Permeability in the radial direction (horizontal) in tested reservoir layer, md
$K_0$ Modified Bessel function of the second kind of order o
l Laplace transform parameter, 1/hr
m Total number of producing wells in tested reservoir layer
m' Index of the (chosen) tested well among m producing wells (1≤m'≤m)
n Total number of leaky offset wells in tested reservoir layer
$p_0$ Initial reservoir pressure, psia
p(x,y,t) Pressure anywhere in tested layer as a function of space, (x, y), and time, t, psia
Δp(x, y, t) Pressure drawdown at (x, y) at a given time, t, $P_0-p(x, y, t)$, psia
$\Delta p(x_j^*, y_j^*, t)$ Pressure drawdown at jth leaky offset well at a given time, t, $p_0-p(x_j^*, y_j^*, t)$, psia
$\overline{\Delta p}(x_j^*, y_j^*, l)$ Laplace transform of pressure drawdown at jth leaky offset well, psia-hr
$p_{wf}(t)$ Wellbore flowing pressure at the tested well (well is completed in tested layer), psia
$\bar{p}_{wf}(l)$ Laplace transform of wellbore flowing pressure $p_{wf}$, psia-hr [The Laplace transform of this time-dependent variable makes it easier to obtain the solution to the problem.]
$\Delta p_{wf}(t)$ Pressure drawdown in tested well (m'th producing well at $(x_{m'}, y_{m'})$), at a given time, t, $p_0-p_{wf}(t)$, psia
$\overline{pp}_{wf}(l)$ Laplace transform of pressure drawdown ($\Delta p_{wf}(t)$) in tested well (m'th producing well at $(x_{m'}, y_{m'})$), $p_0/l-\bar{p}_{wf}(l)$, psia-hr
$q_i$ Constant rate of production in standard conditions from ith producing well, STB/d
$q_j^*$ Crossflow rate in jth leaky offset well as a function of time, defined in Equation (2), reservoir bbl/d
$\bar{q}_j^*$ Laplace transform of crossflow rate $q_j^*$, bbl-hr/d [The Laplace transform of this time-dependent variable makes it easier to obtain the solution to the problem.]
$r_{wai}$ Equivalent wellbore radius in ith producing well, defined in Equation (3), ft
$r_{wm'}$ Physical wellbore radius in m'th producing well (tested well), ft
$r_{wam'}$ Equivalent wellbore radius in m'th producing well (tested well), use Equation (3), ft
$r_{wi}$ Physical wellbore radius in ith producing well, ft
$s_i$ Skin factor in ith producing well t Elapsed time, hr
$\overline{U}$ (n×n) matrix defined in Equations (7), (10a) and (10b)
$\overline{V}$ (n×1) vector defined in Equation (8)
(x, y) Arbitrary coordinates, ft
$(x_i, y_i)$ Coordinates (location) of ith producing well, ft
$(x_j^*, y_j^*)$ Coordinates (location) of jth leaky offset well, ft
$(x_{m'}, y_{m'})$ Coordinates (location) of m'th producing or tested well, ft
$\overline{Z}$ (n×1) vector defined in Equations (9) and (11)
φ Porosity in tested layer, fraction
η Hydraulic diffusivity, $$\frac{0.0002637 \, k}{\phi \mu c_t},$$

md-psi/cP
μ Viscosity of fluid, cP

A complete set of equations for a reservoir with multiple producing wells and multiple offset wells is presented below.

Pressure Drawdown While Flowing at Tested Well (m'th Producing Well Located at $(x_{m'}, Y_{m'})$):

$$\overline{\Delta p}_{wf}(l) = \frac{141.2\mu}{khl} \left[ \sum_{i=1}^{m} \frac{q_i B_o K_0 \left( \sqrt{\frac{l[(x_{m'} + r_{wam'} - x_i)^2 + (y_{m'} + r_{wam'} - y_i)^2]}{\eta}} \right)}{1 + \frac{(141.2)(24) C_i l \mu \, K_0\left( r_{wai} \sqrt{\frac{2l}{\eta}} \right)}{kh}} \right] - \frac{1}{2\pi kh} \left[ \sum_{j=1}^{n} F_{cj} \overline{\Delta p}(x_j^*, y_j^*, l) K_0 \left( \sqrt{\frac{l[(x_{m'} + r_{wam'} - x_j^*)^2 + (y_{m'} + r_{wam'} - y_j^*)^2]}{\eta}} \right) \right] \quad (4)$$

Crossflow Rates Through jth Leaky Offset Well at Reservoir Conditions:

$$\bar{q}_j^*(x_j^*, y_j^*, l) = \frac{F_{cj} \overline{\Delta p}(x_j^*, y_j^*, l)}{282.4 \pi \mu} \quad (5)$$

for j=1, 2, 3, . . . , n.

Pre-Calculations of $\overline{\Delta p}(x_j^*, y_j^*, l)$ under $\overline{V}$ for Substitution in Equations (4) and (5):

$$\overline{U}\overline{V} = \overline{Z} \quad (6)$$

where:

$$\overline{U} = \begin{bmatrix} u_{11} & u_{12} & u_{13} & \cdots & \cdots & u_{1n} \\ u_{21} & u_{22} & u_{23} & \cdots & \cdots & u_{2n} \\ u_{31} & u_{32} & u_{33} & \cdots & \cdots & u_{3n} \\ \cdots & \cdots & \cdots & \cdots & \cdots & \cdots \\ u_{n1} & u_{n2} & u_{n3} & \cdots & \cdots & u_{nn} \end{bmatrix} \quad (7)$$

$$V = \begin{bmatrix} \overline{\Delta p}(x_1^*, y_1^*, l) \\ \overline{\Delta p}(x_2^*, y_2^*, l) \\ \overline{\Delta p}(x_3^*, y_3^*, l) \\ \cdots \cdots \\ \overline{\Delta p}(x_n^*, y_n^*, l) \end{bmatrix} \quad (8)$$

$$\overline{Z} = \begin{bmatrix} Z_1 \\ Z_2 \\ Z_3 \\ \cdots \cdots \\ Z_n \end{bmatrix} \quad (9)$$

The steps of pre-calculations of elements under $\overline{V}$ are described below after definition of the elements $\overline{U}$ and $\overline{Z}$.

The elements in the (n×n) matrix, $\overline{U}$, in Equation (7) can be presented as:

$$u_{jj} = 1 + \frac{F_{cj}}{2\pi kh} K_0\left(r_{waj}\sqrt{\frac{2l}{\eta}}\right) \quad (10a)$$

$$u_{jj'}_{j' \neq j} = \frac{F_{cj'}}{2\pi kh} K_0\left(\sqrt{\frac{l[(x_j^* - x_{j'}^*)^2 + (y_j^* - y_{j'}^*)^2]}{\eta}}\right) \quad (10b)$$

The elements in the (n×1) vector, $\overline{Z}$, in Equation 9 can be presented as:

$$Z_j = \frac{141.2\mu}{kh}\left[\sum_{i=1}^{m} \frac{q_i B_o K_0\left(\sqrt{\frac{l[(x_j^* - x_i)^2 + (y_j^* - y_i)^2]}{\eta}}\right)}{l\left[1 + \frac{(141.2)(24)C_i l\mu\ K_0\left(r_{wai}\sqrt{\frac{2l}{\eta}}\right)}{kh}\right]}\right] \quad (11)$$

In Equations (10a), (10b) and (11), j=1, 2, 3, . . . , n, and also j'=1, 2, 3, . . . , n, but j'≠j. The (n×1) vector in Equation (8), $\overline{V}$, is populated with all n unknown $\overline{\Delta p}(x_j^*, y_j^*, l)$ values, which are to be determined from the following equation, deduced from Equation (6).

$$\overline{V} = \overline{U}^{-1}\overline{Z} \quad (12)$$

where $\overline{U}^{-1}$ is the inverse of matrix, $\overline{U}$, which must be invertible. With this the process of pre-calculating $\overline{\Delta p}(x_j^*, y_j^*, l)$ is now complete.

Thus n of $\overline{\Delta p}(x_j^*, y_j^*, l)$ values in all (j=1, 2, 3, . . . , n), contained in vector, $\overline{V}$, can be substituted back into Equations (4) and (5) to calculate the respective values of $\overline{\Delta p}_{wf}$ and $\overline{q}_j^*$ (j=1, 2, 3, . . . , n). It is to be noted that the sizes of the matrix and the vectors above depend on the number of leaky offset wells (n) in the system, not on the number of producing wells (m) in the system. These calculated values of $\overline{\Delta p}_{wf}$ and $\overline{q}_j^*$ (j=1, 2, 3, . . . , n) are then inverted back to the time domain with the Stehfest algorithm (1970) for the respective values of $\Delta p_{wf}$ and $q_j^*$ (j=1, 2, 3, . . . , n).

As mentioned earlier that computations of $\Delta p_{wf}$ and $q_j^*$ (j=1, 2, 3, . . . , n), as functions of elapsed time, using Equations (4) and (5), respectively, require employing the Stehfest algorithm (1970). A person skilled in the art should be able to perform this step readily without any difficulty.

While calculating the pressure drawdown, $\Delta p_{wf}$ at the tested well with Equation (4), the corresponding pressure derivative $$\left(\left|t\frac{dp_{wf}}{dt}\right| = \left|t\frac{d\Delta p_{wf}}{dt}\right|\right)$$

is also calculated simultaneously, both as functions of time after applying the Stehfest algorithm to their Laplace-space versions. This step is completed by utilizing the process outlined by Rahman and BinAkresh [2013, Paper SPE 184217 Profiling Pressure-Derivative Values]. It should also be noted that the calculated values with the Equations as presented above, following the inverse Laplace transforms, result in pressure drawdown $\Delta p_{wf}$ in psia, pressure derivative $$\left|t\frac{dp_{wf}}{dt}\right|$$

in psia, and rate of influx in each offset well $q_j^*$ (j=1, 2, 3, . . . , n) in bbl/d, all as functions of elapsed time. Any variations from the system of US Oilfield units or conversions to another system of units can readily be accommodated.

Although the methodology described above and each of the equations presented above are described in the context of drawdown cases (when the tested well is in continuous production), the present invention is equally applicable to the buildup cases (when the tested well is shut-in following a period of production) through the use of the principle of superposition, which is a commonplace and conventional known practice commonly utilized by those skilled in the art in the petroleum industry.

Figure 4:
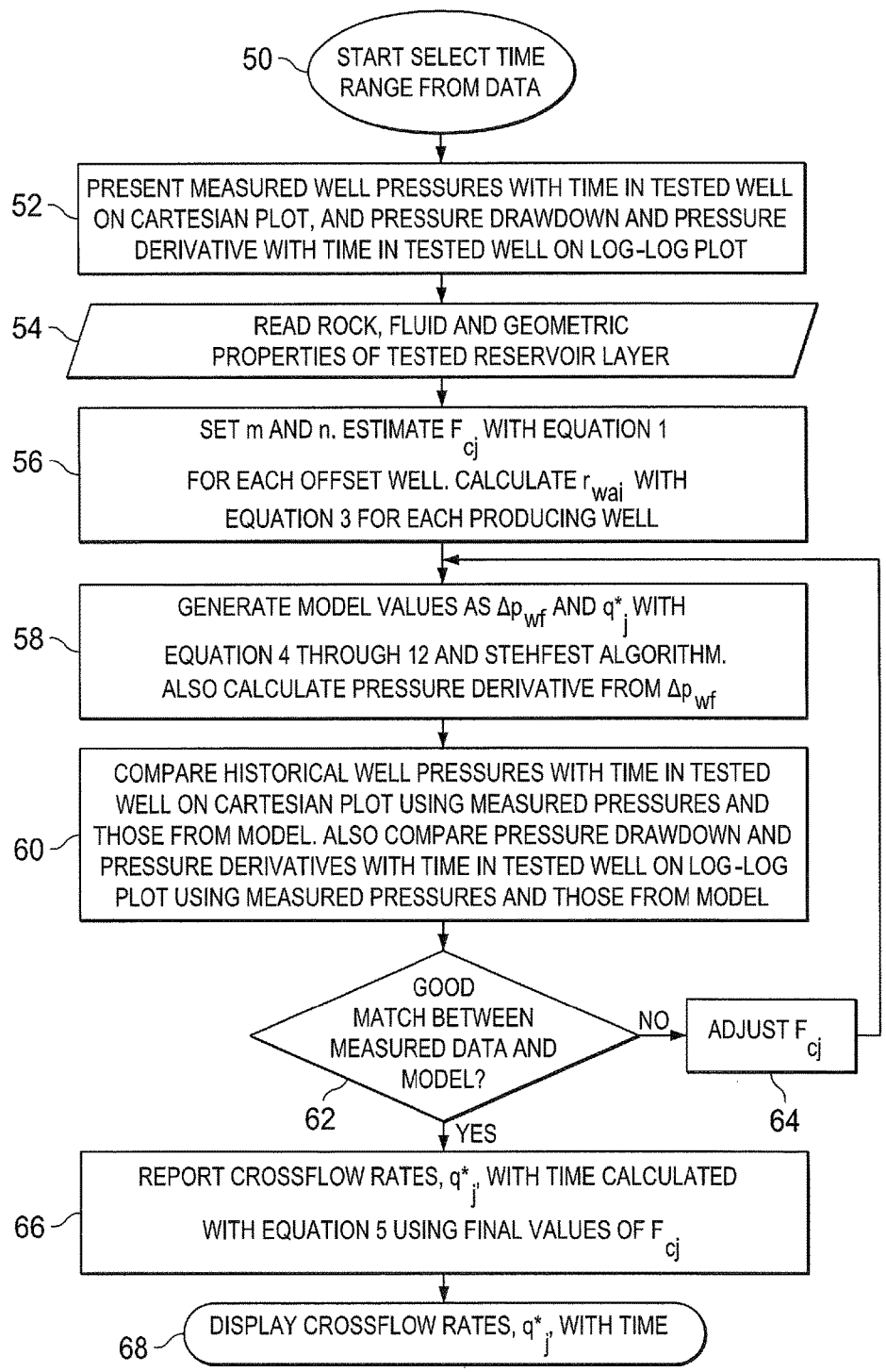
FIG. 4 is a functional block diagram of a flow chart of data processing steps for measuring inter-reservoir cross flow rate through unintended leaks in zonal isolation cement sheath in offset wells according to the present invention.

A comprehensive methodology of determining pressure drawdown at the flowing well, pressure derivatives and crossflow rates from the above model and of estimating the conductivity of cement sheath, $F_{cj}$, at each leaky offset well (j=1, 2, 3, . . . , n), utilizing transient-test data through an iterative scheme is illustrated in FIG. 4. The pressure drawdown is defined as the difference between the initial reservoir, $p_0$, or the initial well flowing pressure, $p_{wf}(t=0)$, and the current well flowing pressure, $p_{wf}(t)$. Thus this pressure drawdown at the flowing well should grow with time when the well is producing.

A flow chart F (FIG. 4) illustrates schematically a computer implemented process according to the present invention of determining well pressures, pressure derivative and crossflow rates from the above model and of estimating of inter-reservoir crossflow rates between adjacent layers with time from pressure transient-test data through an iterative method.

The flow chart F (FIG. 4) illustrates the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of data transformation or processing steps corresponding to those shown.

FIG. 4 illustrates schematically a preferred sequence of steps of a computer implemented process according to the present invention for analyzing a subsurface reservoir of interest to determine inter-reservoir crossflow rates with multiple producing wells 40 of the type shown at 10 in FIG. 1 and multiple offset wells 42 of the type shown at 12 in FIG. 1.

As shown at step 50 in FIG. 4, processing according to the present invention begins with a time range being selected from the pressure and time data obtained during pressure transient test of a layer of interest such as test layer 14 (FIG. 1). A specified well (the m'th well as defined above) is identified as the reference or tested well (1≤m'≤m) during step 52. The model and its structure have been described above in terms of equations in the Laplace domain. During step 52, the measured well pressure $p_{wf}$ with time for the tested well is formatted for storage and subsequent display, preferably in Cartesian format. The pressure drawdown $\Delta p_{wf}(t)$ and (absolute values of) pressure derivative $$\left(t\frac{dp_{wf}}{dt}\right)$$

for the tested well are also calculated and formatted during step 52 in a form for storage and subsequent display in log-log plots. The data stored during step 52 are available for output display by data processing system D (FIG. 5) in their respective formats.

The present invention is applicable when there is crossflow of fluid in the offset wells. From the display of the log-log plots during step 52, an analyst should be able to conclude if there is any crossflow going on in the offset wells by observing a slanted deviation of the pressure-derivative trend from the tested well from the reservoir transmissibility line. Analysis thus will utilize the type curves of the model of this invention to confirm the existence of the crossflow during step 52. More details on diagnosis of crossflow are presented below.

During step 54, the petrophysical and reservoir data including the rock, fluid and geometric properties for the tested layer 14 are assembled and stored in the data processing system D. Usually porosity, fluid saturation and pay thickness can be extracted from the interpretation of the open-hole log of the wells in the same reservoir layers. Fluid properties as viscosity, compressibility and formation volume factor can be found from fluid analysis reports. Permeability in the tested reservoir layer can be found from the previous or the current present transient test. Also during step 54, well parameters such as wellbore storage constants and skin factors in each of the m producing wells in the tested layer 14 are gathered. These parameters may be subject to refinement later, as will be discussed below, in connection with the refinement of values of conductivity of cement sheaths.

In step 56, the number of producing wells, m, and the number of leaky offset wells, n, in tested reservoir layer 14 are established. Having identified the reference or tested well (1<m'<m) during step 52, subsequent calculations and determinations with the measured data and the model are to be referenced or normalized with respect to those of the reference well. Also during step 56, initial measures or estimates of $F_{cj}$, the conductivity of the cement sheath, as defined above, for each of the offset wells is determined based on Equation (1). The equivalent wellbore radius $r_{wai}$ of each producing well is also determined according to Equation (3) during step 56.

Capture the actual transient-pressure data as measured pressures and rates at the tested well (m'th well) with time. A log-log plot of the pressure derivative with time should indicate any crossflow of fluid through leaky cement in offset well(s) as determined in step 52.

During step 58, model values of pressure drawdown in the tested well $\Delta p_{wf}(t)$, and crossflow rate $q_j^*$ for each of the j leaky offset wells are determined using the methodology described with Equations (4) through (12) and the Stehfest algorithm mentioned above. The model is run during step 58 with the petrophysical and reservoir parameters for different plausible values of conductivity of cement sheath, $F_{cj}$, in each offset well (for j=1, 2, 3, . . . , n). The pressure derivative $$\left(t\frac{dp_{wf}}{dt}\right)$$

of the tested well pressure drawdown $\Delta p_{wf}(t)$ is also determined during step 58. The respective pressure and derivative plots are made ready to compare with the actual pressure and derivative of data from actual transient tests. The data values determined during step 58 are formatted in a form for storage and subsequent display in either Cartesian or log-log plots as described above, and are available as indicated at step 60 in that format for output display by data processing system D. During step 58, predicted crossflow profiles with time are also generated from the model using the current (assumed or refined) values of $F_{cj}$, in offset wells (for j=1, 2, 3, . . . , n).

During step 60, the historical well pressures in the tested well during a transient test are compared with model well pressures on Cartesian plots. The respective generated pressure drawdown and pressure derivative at the tested well from the model are also compared on log—log plots during step 60 with the actual (measured) pressure drawdown and derivative of data from actual transient tests at the tested well. Graphical or visual comparisons are performed for each of well pressure, pressure drawdowns and pressure derivative during step 60. The model has been presented earlier in terms of equations in the Laplace domain.

A quantitative comparison is made during step 62 between the model-generated pressures from step 58 and the measured pressures from a transient test from step 52 by calculating the statistical standard deviation between these two quantities over the period of the transient test. If the calculated standard deviation in step 62 is within the tolerance, specified by the analyst, the model parameters and its generated output (well pressure, pressure derivative and crossflow rates in offset wells) are acceptable for the next step 68. If the calculated standard deviation in step 62 is higher than the tolerance; specified by the analyst, the model parameters and its generated output (well pressure, pressure derivative and crossflow rates in offset wells) are not acceptable; hence, the next step 64 follows.

It is a common practice to leave out the criteria of determining the closeness between the measured and the model values with the analyst. Such a process involves minimizing the standard deviation between the measured pressures and the model pressures to a preset tolerance (for example, 0.1 psia). As the tolerance value is preset to lower value, the computational burden increases. Once such a preset tolerance is satisfied in step 62, people skilled in the art will be pleased to call the model as the reasonably well matched one.

As there is confirmation of crossflow in step 52, the value(s) of the conductivity of cement sheath, $F_{cj}$ (for j=1, 2, 3, ..., n), are expected to be non-zero, positive. The values of the conductivity of cement sheath are refined or adjusted during step 64 as part of an iterative scheme according to the present invention to get a match between the model values of pressure and pressure derivative with the measured values of pressure and pressure derivative from the test. As explained above, an acceptable or good match of the model is the condition when standard deviation between the measured pressures and model pressures at the tested well is within a preset tolerance. Due to uncertainty in some of or all the components in Equation (1), the longitudinal permeability of cement in particular, for example, one cannot be certain about the estimates of $F_{cj}$ (for j=1, 2, 3, ..., n). Thus, iteration during step 64 according to the present invention based on adjustment of the cement sheath conductivity parameter of each offset well based on the test data is provided, seeking for more reasonable sets of values in every further processing step. If desired, the skin factors and wellbore storage values of the producing wells can also be iteratively adjusted to secure a better match between the model values and measured test values.

If an acceptable match is indicated between test data and model data during step 62, the crossflow rates of $q_j^*$ in offset wells with time are stored and reported by the data processing system D during step 66 and displayed during step 68.

Once an acceptable match is indicated between the test data and model data during step 62, the values of the conductivity of cement sheath can henceforth be used to estimate the crossflow rates through the individual offset wells from the adjacent reservoir layer to the tested reservoir layer. Although the crossflow rates as functions of time are usually the output of the model in step 58 for the respective value(s) of $F_{cj}$ (for j=1, 2, 3, ..., n), the final set of crossflow rates following a match with the test data determined in step 62 should be used for further studies or making future decisions.

Having quantified the crossflow between the layers through the unintended leak in the cement sheath, analysts/engineers are now able to characterize the tested reservoir layer accurately. Subsequent reserve and voidage replacement calculations can be expected to be reasonably accurate when the crossflow is present.

Figure 5:
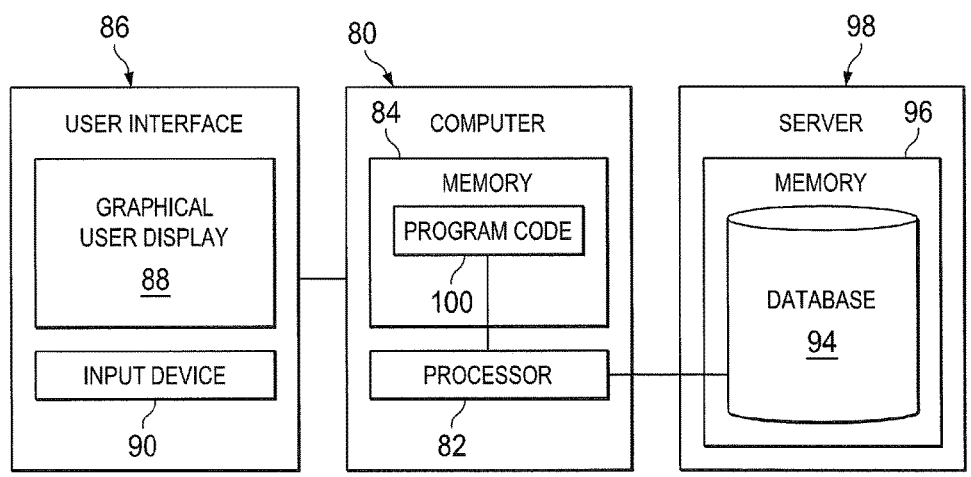
FIG. 5 is a schematic diagram of a data processing system for inter-reservoir cross flow rate through unintended leaks in zonal isolation cement sheath in offset wells according to the present invention.

As illustrated in FIG. 5, the data processing system D includes a computer 80 having a processor 82 and memory 84 coupled to the processor 82 to store operating instructions, control information and database records therein. The data processing system D may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y. or other source. The data processing system D may also be a computer of any conventional type of suitable processing capacity, such as a personal computer, laptop computer, or any other suitable processing apparatus. It should thus be understood that a number of commercially available data processing systems and types of computers may be used for this purpose.

The processor 82 is, however, typically in the form of a personal computer having a user interface 86 and an output display 88 for displaying output data or records of processing of measurements performed according to the present invention. The output display 88 includes components such as a printer and an output display screen capable of providing printed output information or visible displays in the form of graphs, data sheets, graphical images, data plots and the like as output records or images.

The user interface 86 of computer 80 also includes a suitable user input device or input/output control unit 90 to provide a user access to control or access information and database records and operate the computer 80.

Data processing system D further includes a database 94 stored in memory, which may be internal memory 84, or an external, networked, or non-networked memory as indicated at 96 in an associated database server 98. The database 94 also contains various data including the time and pressure data obtained during pressure transient testing of the layer under analysis, as well as the rock, fluid and geometric properties of layers 14 and 16, and the casing, annulus and other formation properties, physical constants, parameters, data measurements identified above with respect to FIGS. 1, 2 and 3 and the Nomenclature table.

The data processing system D includes program code 100 stored in a data storage device, such as memory 84 of the computer 80. The program code 100, according to the present invention, is in the form of computer operable instructions causing the data processor 82 to perform the methodology of determining inter-reservoir cross flow rate through unintended leaks in zonal isolation cement sheath in offset wells. The iterative scheme for improving or adjusting the values of conductivity of cement sheaths as per step 64 (FIG. 4) is governed by program code 100 in the data processing system D.

It should be noted that program code 100 may be in the form of microcode, programs, routines, or symbolic computer operable languages that provide a specific set of ordered operations that control the functioning of the data processing system D and direct its operation. The instructions of program code 100 may be stored in non-transitory memory 84 of the computer 80, or on computer diskette, magnetic tape, conventional hard disk drive, electronic read-only memory, optical storage device, or other appropriate data storage device having a computer usable medium stored thereon. Program code 100 may also be contained on a data storage device such as server 88 as a non-transitory computer readable medium, as shown.

The processor 82 of the computer 80 accesses the pressure transient testing data and other input data measurements as described above to perform the logic of the present invention, which may be executed by the processor 82 as a series of computer-executable instructions. The stored computer operable instructions of program code 100 cause the data processor 82 to determine measures of inter-reservoir cross flow rate through unintended leaks in zonal isolation cement sheath in offset wells in the manner described above and shown in FIG. 4. Results of such processing are then available on output display 88.

Diagnostic Plots

Using the physical relationships governed by the Equations (1) through (12) presented above, diagnostic plots can be generated to ascertain if there is any crossflow through leaky cement sheath in offset well(s) between the two reservoir layers. To illustrate the concept, consider a simple system such as shown in FIG. 1 with one producing well and one offset well with leaky cement sheath in the tested layer. The sole producing well here is considered the tested well.

Figure 6:
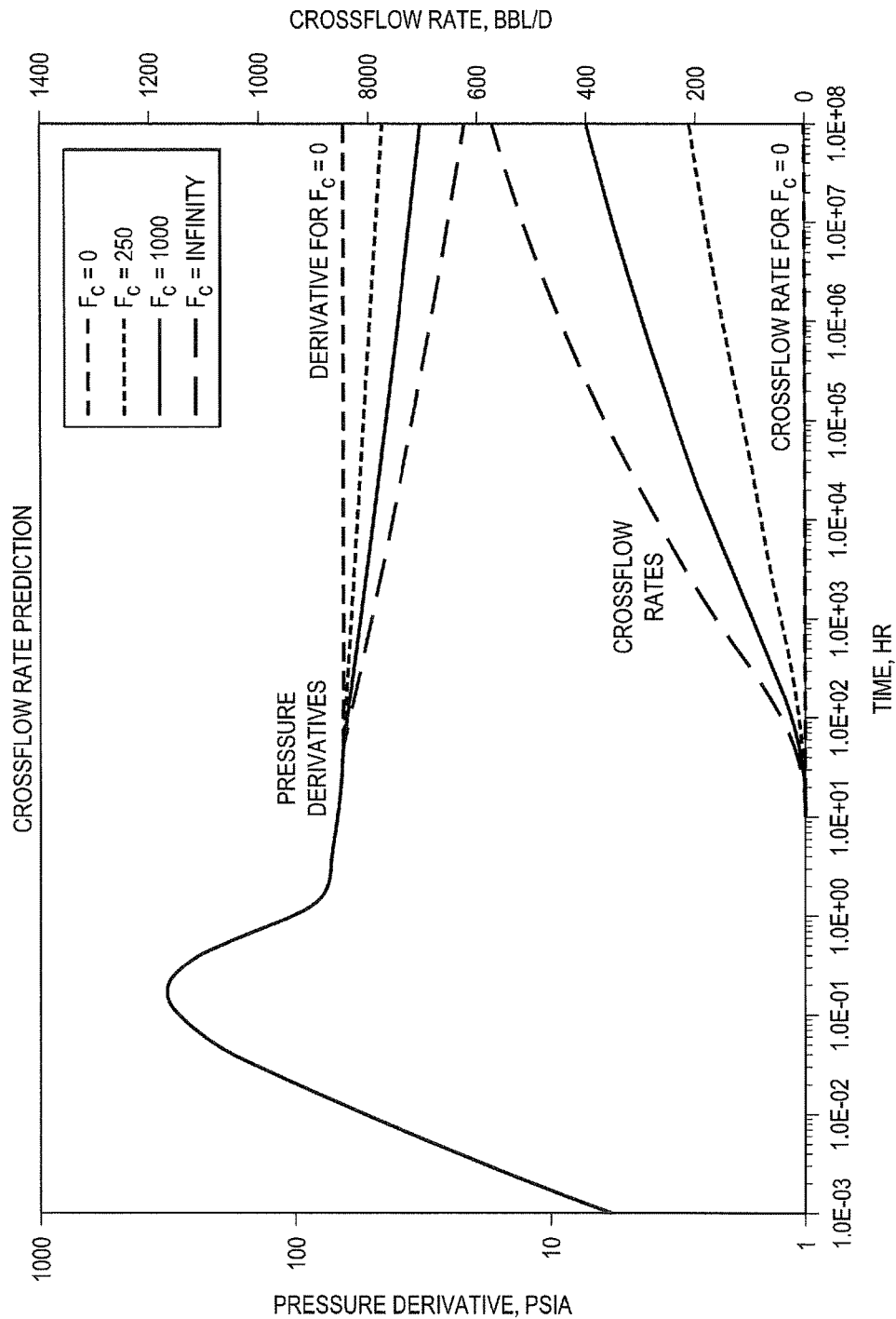
FIG. 6 is an example plot of data obtained from a case study during measuring inter-reservoir cross flow rate through unintended leaks in zonal isolation cement sheath in offset wells according to the present invention.

FIG. 6 is a diagnostic plot which shows the effects of the conductivity of cement sheath, $F_c$, on the pressure derivative and on the respective crossflow rates from the adjacent to the tested reservoir layer. Since this model is considering only one producing well and only one offset well in this system, the indices i and j are deleted for simplicity. A zero value to $F_c$ means that the adjacent layer is hydraulically isolated from the tested reservoir layer in the reservoir region; only the tested reservoir layer can contribute to production as the producing well is completed across the tested reservoir layer only. Thus, the case of $F_c$=0 md.ft replicates nothing but a situation of the well producing from a single-layer reservoir as having the tested reservoir layer absolutely isolated from the adjacent reservoir layer.

As shown in FIG. 6, for the case with $F_c$=0 md.ft (one of the two extreme cases), the derivative profile is parallel to the time axis at the late times (after tens of hours of flow)—this reference line is also called the "reservoir transmissibility line" (as discussed below with FIG. 7). This is true for the crossflow-rate profile too, with zero value all the time. But for a non-zero value of the cement conductivity (for example, $F_c$=250 md.ft), the derivative profile is slanted towards the one for an infinite value of $F_c$.

The recognition of the slanted deviation of the derivative profile in the late time from the parallelism of the time scale is very important in diagnosing the presence of any leaky cement sheath in the offset well(s). This constitutes a hallmark signature of any crossflow between layers through the leaky cement sheath. The onset of the deviation depends on the distance between the offset well and the tested well. The further the distance between the wells, the later the onset is.

It can be seen that there is no crossflow from the adjacent reservoir layer until the onset of the deviation of pressure derivative appears in the log-log plot of pressure derivative as in FIG. 6—the crossflow starts as soon there is some pressure drawdown at the location of the leaky offset well. Once the value of $F_c$ (or $F_{cj}$) is established, determination of the crossflow rates through the cement sheath are straightforward in the data processing system D form Equation (2) above.

Although the above illustrative example has considered only one producing well and one offset well in the system, there can be multiple producing wells and multiple offset wells in actual oilfield conditions. As described above, the present invention has the capability of dealing with complicated well configurations with multiple well systems (m producing wells and n offset wells at arbitrary locations).

The case of $F_c$=infinity replicates very high longitudinal permeability of the cement sheath, which is equivalent to having no cement or any other barriers at all to resist fluid flow in the annulus (space between the drilled hole and the casing)—this enables the location of the offset well in the tested reservoir layer to maintain a pressure equal to the reservoir pressure at the adjacent reservoir layer. Hence, the case of $F_c$=0 md.ft and the case of $F_c$=infinity as shown in FIG. 6, constitute the two possible extreme cases of the cement conductivity—one with zero crossflow rate and the other with a maximum possible crossflow rate, respectively.

In practice, it has been observed with the present invention that finite values of $F_c$, exceeding a threshold value behave as if $F_c$=infinity. Through numerical experiments, it has been found that $F_c$>6πkh behaves as if $F_c$=infinity. The most practical cases of leaky offset wells will probably show values in between the two extreme cases, for example with $F_c$=250 and 1,000 md.ft. as shown in FIG. 6. Diagnostic plots as FIG. 7 can be constructed from the model with a view to matching the actual data (pressure drawdown at tested well and its derivative) from transient-pressure tests. The process has been presented in the flow chart in FIG. 4.

The data values generated from the model in FIG. 6 are presented as a function of time. The time axis in FIG. 6 is presented on a logarithmic scale. The relative crossflow rate is presented on a linear, vertical scale axis on the right-hand side. The other model quantities are presented on a logarithmic scale axis on the left-hand side.

Figure 7:
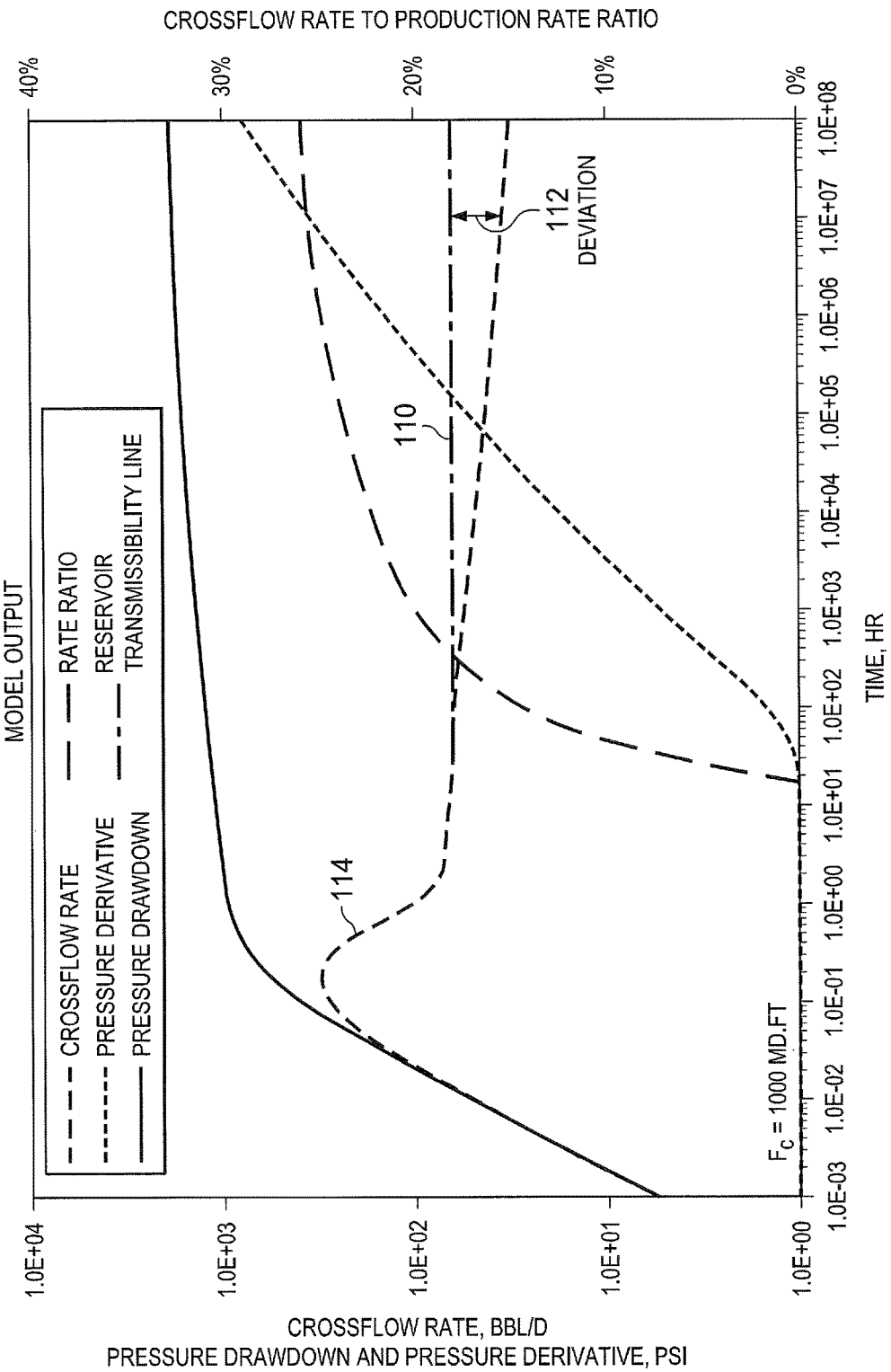
FIG. 7 is an example of plot of data from a tested well obtained in a case study according to the present invention.

FIG. 7 presents results of one case study according to the present invention, showing the output of the model parameters with specific permeability, $F_c$=1,000 md.ft. The petrophysical, reservoir, fluid, and well properties that have been input to the model for this case study are listed in Table 1.

The output in FIG. 7 shows pressure drawdown at the flowing well, pressure derivatives, crossflow rates and their relative crossflow rate to the total rate of production (as the ratio of crossflow rate to production rate expressed in percentage). The "reservoir transmissibility line", parallel to the time axis can be seen at 110. The vertical ordinate value of the reservoir transmissibility line is used to calculate the value of reservoir transmissibility. As discussed above, any reasonably substantial deviation such as shown at 112 from the reservoir transmissibility line is an indication of some unintended leak in the cement sheath. The quantities are presented as functions of time. The time axis is presented on a logarithmic scale. The relative crossflow rate is presented on a linear, vertical scale on the right-hand side. All other model quantities are presented on a logarithmic scale on the left-hand side. In this case, the effect of wellbore-storage phenomenon is apparent from the derivative profile up to 3 hr, following a period with a hump indicated at 114.

TABLE 1

| Input Parameters to Model | | |
| --- | --- | --- |
| Tested Layer | Fluid | Wells |
| k = 95 md | µ = 0.75 cP | C = 0.01 bbl/psi |
| φ = 0.18 | $B_o$ = 1.34 bbl/STB | q = 1,030 STB/d |
| h = 12 ft | | $p_0$ = 3,000 psia |
| $c_t$ = 3.0e−6/psi | | s = +1 |
| | | $r_w$ = 0.3 ft |
| | | $F_c$ = 1,000 md.ft (cement sheath) |
| | | Location of producing well: |
| | | x = 0 ft |
| | | y = 0 ft |
| | | Location of offset well: |
| | | x* = 3,280 ft |
| | | y* = 0 ft |

The present invention provides a diagnostic methodology to evaluate if there is any additional fluid migrating to the tested reservoir layer. If so, an engineer/analyst professional is able to estimate the amount of the additional flow rate joining the tested reservoir layer. Knowing these facts, the tested reservoir layer can be characterized accurately, including the amount of hydrocarbon reserves in the tested layer. Moreover, this information is also important in designing an effective water injection strategy in voidage replacement for an optimum reservoir management. When professionals have the estimates of crossflow rates as functions of time, they are able to determine the cumulative amounts of migrated fluids with time for material balance calculations or for record keeping purposes.

The present invention provides a systematic method to diagnose and quantify the rates of crossflow through leaky cement sheath(s) from one layer to the other. If the crossflow rate through the cement sheath is unacceptable, workover engineers can call for a remedial intervention into the leaky offset well.

With the present invention, it has been found that the rate of influx at a given time is dominated by the less of the two limiting properties—the flow capacity of the tested reservoir layer (kh) to absorb fluid from adjacent layer and the deliverability into the tested reservoir layer from the adjacent reservoir layer through the leaky cement ($F_c$). A characteristic parameter, called dimensionless conductive capacity of cement sheath, $F_{cD}$, has been recognized as $$F_{cD} = \frac{F_c}{2\pi kh} \quad (13)$$

When $F_{cD} > 3$, the system behaves like $F_c$ or $F_{cD} = \infty$ (infinity). In this case the reservoir (receiving) flow capacity of the tested layer is overrun by the influx capacity of the offset well, and a maximum possible rate of influx is being delivered to the tested layer at any given time by the offset well—here bottlenecking takes place in the tested reservoir layer due to its limited flow capacity. When $F_{cD} < 2$, the system behaves like the offset well cannot deliver as much fluid the tested reservoir can accept from the adjacent reservoir—thus bottlenecking takes place in the cement sheath due to its limited hydraulic conductivity. The values in between 2 and 3 indicate transition between the two extreme situations discussed above. In practice, $F_{cD} > 1$ should be quantified as excessive leakage, and a well intervention for remedial action should be called for.

The present invention also provides a systematic method to diagnose leakage in the cement sheath in offset well(s) and to estimate time-dependent rates of crossflow through leaky cement sheath from the adjacent layer to the tested layer, which is subject to drawdown due to the producing well(s). Reservoir engineers need to know the amounts of fluid migrating to or from a layer for devising effective reservoir management. In addition, reserve estimates and voidage replacement during the production of hydrocarbons through water injection are also affected by the amounts of fluids lost or gained through crossflow. This invention will help professionals do a reasonable job in these areas. The present invention also assists reservoir professionals in these areas.

The present invention thus provides a methodology for estimating inter-layer crossflow rates from pressure transient tests. The importance and benefits of estimating crossflow rates have been described. The present invention provides for estimation of the crossflow rates as a function of time through matching the data from pressure transient tests. The methodology of the present invention also provides the ability to diagnose the existence of any crossflow between the two adjacent layers in the reservoir through comparison between the measured data from pressure transient tests and the model.

The invention has been sufficiently described so that a person with average knowledge in the field of reservoir modeling and simulation may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. A method of determining a measure of inter-reservoir crossflow rate to a tested layer of a subsurface reservoir through leaks in the tested layer from cement sheaths of offset wells drilled to reach adjacent layers to the tested layer and bypassing the tested layer during a pressure transient test of the tested layer to perform workover operations when the cement sheaths of the offset wells are leaky, comprising the steps of:

obtaining a test measure of well pressure during the pressure transient test on the tested layer;

determining a test pressure derivative of the test well pressure at sampled instants of measurement during the pressure transient test of the tested layer;

receiving in a computer estimated values of conductivity of the cement sheaths of the offset wells;

determining with the computer a model wellbore flowing pressure at the tested layer based on the test measure of well pressure and the estimated values of conductivity of the cement sheaths of the offset wells;

determining with the computer a model pressure derivative at the tested layer based on the test pressure and the estimated values of conductivity of the cement sheaths of the offset wells;

determining with the computer model inter-reservoir crossflow rates in the offset wells to the tested layer based on the estimated values of conductivity of the cement sheaths of the offset wells; and if the estimated measures and test measures match, storing in the computer the estimated values of conductivity of the cement sheaths of the offset wells, the model inter-reservoir crossflow rates in the offset wells to the tested layer, the model wellbore flowing pressure, and the model pressure derivative;

forming a set of inter-reservoir crossflow rates from the offset wells through the cement sheaths of the offset wells to the tested layer to indicate leaks in the cement sheaths of the offset wells; and performing workover operations on leaky offset wells based on the formed inter-reservoir crossflow rates to the tested layer indicating leaks in the cement sheaths of the offset wells;

and, if not, adjusting the values of conductivity of the cement sheaths of the offset wells, and iteratively repeating in the computer the steps of determining a model wellbore flow pressure, determining a model pressure derivative, and determining a model inter-reservoir crossflow rates in the offset wells to the tested layer based on the adjusted values of conductivity of the cement sheaths of the offset wells until the estimated measures and test measures match.

2. The computer implemented method of claim 1, further including the step of forming an output display of the stored inter-reservoir crossflow rate to the tested layer.

3. The computer implemented method of claim 1, further including the step of forming an output display of the stored estimated values of conductivity of the cement sheaths of the offset wells.

4. The computer implemented method of claim 1, further including the step of forming an output display of the stored model wellbore flowing pressure.

5. The computer implemented method of claim 1, further including the step of forming an output display of the stored model pressure derivative.

6. The computer implemented method of claim 1, wherein the pressure transient testing is performed during well drawdown.

7. The computer implemented method of claim 1, wherein the pressure transient testing is performed during well buildup.

8. A data processing system for determining a measure of inter-reservoir crossflow rate to a tested layer of a subsurface reservoir through leaks in cement sheaths of offset wells drilled to reach adjacent layers to the tested layer and bypassing the tested layer during a pressure transient test of the tested layer to perform workover operations when the cement sheaths of the offset wells are leaky, the data processing system comprising:
a processor performing the steps of:
obtaining a test measure of well pressure during the pressure transient test of the tested layer;
determining a test pressure derivative of the test well pressure at sampled instants of measurement during the pressure transient test of the tested layer;
receiving estimated values of conductivity of the cement sheaths of the offset wells;
determining a model wellbore flowing pressure of the formation layers based on the test measure of well pressure and the estimated values of conductivity of the cement sheaths of the offset wells;
determining a model pressure derivative at the tested layer based on the test pressure and the estimated values of conductivity of the cement sheaths of the offset wells;
determining model inter-reservoir crossflow rates in the offset wells to the tested layer; and
if the estimated measures and test measures match, storing the estimated values of conductivity of the cement sheaths of the offset wells, the model inter-reservoir crossflow rates in the offset wells to the tested layer, the model wellbore flowing pressure, and the model pressure derivative;
forming a set of inter-reservoir crossflow rates from the offset wells through the cement sheaths of the offset wells to the tested layer to indicate leaks in the cement sheaths of the offset wells to indicate if workover operations are to be performed based on the estimated values of conductivity of the cement sheaths of the offset wells;
and, if not,
adjusting the values of conductivity of the cement sheaths of the offset wells, and
iteratively repeating the steps of determining a model wellbore flow pressure, determining a model pressure derivative, and determining model inter-reservoir crossflow rates in the offset wells to the tested well based on the adjusted values of conductivity of the cement sheaths of the offset wells until the estimated measures and test measures match; and
a memory storing the estimated values of conductivity of the cement sheaths of the offset wells, the model inter-reservoir crossflow to the tested layer, the model wellbore flowing pressure, and the model pressure derivative.

9. The data processing system of claim 8, further including:
the output display forming an output record of the stored measure of the estimated values of conductivity of the cement sheaths of the offset wells.

10. The data processing system of claim 8, further including:
the output display forming an output record of the stored model wellbore flowing pressure.

11. The data processing system of claim 8, further including:
an output display forming an output record of the stored model inter-reservoir crossflow to the tested layer.

12. The data processing system of claim 11, further including:
the output display forming an output record of the stored model pressure derivative.

13. A computer implemented method of determining flow capacity of offset wells to a tested layer of a subsurface reservoir through leaks in cement sheaths of the offset wells drilled bypassing the tested layer during a pressure transient test of the tested layer, the computer implemented method comprising the steps of:
obtaining a test measure of well pressure during the pressure transient test on the tested layer;
determining a test pressure derivative of the test well pressure at sampled instants of measurement during the pressure transient test of the tested layer;
receiving estimated values of conductivity of the cement sheaths of the offset wells;
determining a model wellbore flowing pressure at the tested layer based on the test measure of well pressure and the estimated values of conductivity of the cement sheaths of the offset wells;
determining a model pressure derivative at the tested layer based on the test pressure and the estimated values of conductivity of the cement sheaths of the offset wells;
determining model inter-reservoir crossflow rates in the offset wells to the tested layer based on the estimated values of conductivity of the cement sheaths of the offset wells; and
if the estimated measures and test measures match, storing the estimated values of conductivity of the cement sheaths of the offset wells, the model inter-reservoir crossflow rates in the offset wells to the tested layer, the model wellbore flowing pressure, and the model pressure derivative;
forming the measure of flow capacity of the offset wells through the cement sheaths of the offset wells to the tested layer from the stored estimated values of conductivity of the cement sheaths of the offset wells;
and, if not,
adjusting the values of conductivity of the cement sheaths of the offset wells, and
iteratively repeating the steps of determining a model wellbore flow pressure, determining a model pressure derivative, and determining a model inter-reservoir crossflow rates in the offset wells to the tested layer based on the adjusted values of conductivity of the cement sheaths of the offset wells until the estimated measures and test measures match.

14. The computer implemented method of claim 13, wherein the offset wells are drilled to reach adjacent layers to the tested layer.

15. A data processing system for determining a measure of flow capacity of offset wells to a tested layer of a subsurface reservoir through leaks in cement sheaths of the offset wells drilled bypassing the tested layer during a pressure transient test of the tested layer when the cement sheaths of the offset wells are leaky, the data processing system comprising:
- a processor performing the steps of:
  - obtaining a test measure of well pressure during the pressure transient test on the tested layer;
  - determining a test pressure derivative of the test well pressure at sampled instants of measurement during the pressure transient test of the tested layer;
  - receiving estimated values of conductivity of the cement sheaths of the offset wells;
  - determining a model wellbore flowing pressure at the tested layer based on the test measure of well pressure and the estimated values of conductivity of the cement sheaths of the offset wells;
  - determining a model pressure derivative at the tested layer based on the test pressure and the estimated values of conductivity of the cement sheaths of the offset wells;
  - determining model inter-reservoir crossflow rates in the offset wells to the tested layer based on the estimated values of conductivity of the cement sheaths of the offset wells; and
  - if the estimated measures and test measures match, storing the estimated values of conductivity of the cement sheaths of the offset wells, the model inter-reservoir crossflow rates in the offset wells to the tested layer, the model wellbore flowing pressure, and the model pressure derivative;
  - forming the measure of flow capacity of the offset wells through the cement sheaths of the offset wells to the tested layer from the stored estimated values of conductivity of the cement sheaths of the offset wells to indicate if workover operations are to be performed based on the estimated values of conductivity of the cement sheaths of the offset wells;

and, if not,
  - adjusting the values of conductivity of the cement sheaths of the offset wells, and
  - iteratively repeating the steps of determining a model wellbore flow pressure, determining a model pressure derivative, and determining a model inter-reservoir crossflow rates in the offset wells to the tested layer based on the adjusted values of conductivity of the cement sheaths of the offset wells until the estimated measures and test measures match; and
- a memory storing the determined model wellbore flow pressure, the determined model pressure derivative, and the determined model inter-reservoir crossflow rates in the offset wells to the tested layer.

16. The data processing system of claim 15, wherein the offset wells are drilled to reach adjacent layers to the tested layer.

* * * * *